(12) United States Patent
Kimberlin et al.

(10) Patent No.: US 6,837,688 B2
(45) Date of Patent: Jan. 4, 2005

(54) OVERHEAT PROTECTION FOR FLUID PUMP

(75) Inventors: Robert R. Kimberlin, Murfreesboro, TN (US); Robert E. Harvey, III, Nashville, TN (US); Jie Jiang, Nashville, TN (US)

(73) Assignee: Standex International Corp., Salem, NH (US)

( * ) Notice: Subject to any disclaimer, the term of this patent is extended or adjusted under 35 U.S.C. 154(b) by 0 days.

(21) Appl. No.: 10/286,083

(22) Filed: Nov. 1, 2002

(65) Prior Publication Data

US 2003/0161732 A1 Aug. 28, 2003

Related U.S. Application Data

(60) Provisional application No. 60/360,693, filed on Feb. 28, 2002.

(51) Int. Cl.$^7$ ................................................. F04B 35/04
(52) U.S. Cl. ........................ 417/32; 417/44.1; 417/423.7
(58) Field of Search ........................... 417/32.13, 14.18, 417/53.63, 420, 423.7, 44.1; 337/3.16, 97

(56) References Cited

U.S. PATENT DOCUMENTS

| | | | |
|---|---|---|---|
| 2,518,597 A | | 8/1950 | Brooks |
| 3,067,690 A | | 12/1962 | Herr et al. |
| 3,288,073 A | | 11/1966 | Pezzillo |
| 4,065,231 A | | 12/1977 | Litzenberg |
| 4,257,745 A | * | 3/1981 | Thur et al. .................... 417/18 |
| 5,145,322 A | | 9/1992 | Senior, Jr. et al. |
| 5,603,608 A | * | 2/1997 | Marz ........................... 417/13 |
| 5,642,991 A | | 7/1997 | Singleterry et al. |
| 5,763,973 A | | 6/1998 | Cramer |
| 5,828,287 A | * | 10/1998 | Nilson ........................ 337/394 |
| 5,919,033 A | | 7/1999 | Singleterry et al. |
| 6,312,226 B1 | * | 11/2001 | Senior et al. .................. 417/32 |

FOREIGN PATENT DOCUMENTS

| | | | |
|---|---|---|---|
| DE | 11 46 580 | | 4/1963 |
| DE | 44 35 511 | | 2/1996 |
| DE | 100 07 787 | | 8/2000 |
| DE | 199 48 972 | | 4/2001 |
| EP | 0 711 019 | | 5/1996 |
| EP | 1 035 328 | | 9/2000 |
| EP | 1158641 A2 | | 4/2001 |
| EP | 1 158 641 A2 | * | 11/2001 .......... H02H/7/085 |
| GB | 909 550 | | 10/1962 |
| GB | 1 358 135 | | 6/1974 |
| GB | 2 239 987 | | 7/1991 |
| WO | WO 99 14503 | | 3/1999 |
| WO | WO 01 29394 | | 4/2001 |

* cited by examiner

Primary Examiner—Charles G. Freay
(74) Attorney, Agent, or Firm—Luedeka, Neely & Graham, P.C.

(57) ABSTRACT

An apparatus for detecting the presence of an overheat condition in a fluid pump includes a pump head for receiving a fluid at a first pressure and outputting the fluid at a second pressure that is greater than the first pressure. A motor is positioned adjacent the pump head to drive the pump head to pressurize the fluid. A single overheat sensor senses an overheat condition in the pump head and an overheat condition in the motor. When a threshold temperature is sensed by the overheat sensor, a switch is activated to prevent operation of the motor. In one embodiment, the overheat sensor and switch are integral and may, for example, take the form of a bi-metal switch formed in the stator windings of the motor. In alternate embodiments, the overheat sensor and switch are separate.

20 Claims, 14 Drawing Sheets

OVERHEAT PROTECTION FOR FLUID PUMP

This nonprovisional application claims priority to provisional application Ser. No. 60/360,693 filed Feb. 28, 2002 and entitled "Canned Motor Pump."

FIELD OF THE INVENTION

The present invention relates generally to fluid pumps. More particularly, the present invention relates to a fluid pump with a single sensor configured to detect an overheat condition in either the pump head or the motor driving the pump head.

BACKGROUND OF THE INVENTION

Fluid pumps with integral motors, such as so-called "canned" pumps, are generally employed in a variety of applications. For example, fluid motor pumps are often used to move potable fluids, such as water, in beverage dispensing machines. Motors employed in such pumps typically include overheat protection to shut down the motor in the event the motor overheats. However, the protective device for the motor is ineffective for protecting the pump head against overheat conditions. When the pump head overheats from, for example, insufficient fluid flow into the pump, the pump head can overheat and the motor will continue to drive the pump head until catastrophic failure occurs.

What is needed, therefore, is an improved fluid pump with the capability to detect overheat conditions in the pump head as well as in the motor which drives the pump head.

SUMMARY OF THE INVENTION

The present invention achieves its objectives by providing an apparatus for detecting the presence of an overheat condition in a motor pump. The apparatus includes a pump head, such as a rotary vane pump head, for receiving a fluid at a first pressure and outputting the fluid at a second pressure that is greater than the first pressure. A motor is positioned adjacent said pump head to drive the pump head to pressurize the fluid. An overheat sensor is operatively associated with both the pump head and the motor for sensing overheat conditions in both the pump head and the motor.

A variety of configurations of the overheat sensor are provided. For example, the overheat sensor may be configured to provide an output indicative of the temperature that is sensed. The temperature signal output by the sensor may be used by another device to prevent motor operation when the sensor signal indicates a threshold temperature has been reached. Alternatively, the overheat sensor may itself be further operable to prevent operation of the motor when an overheat condition is sensed. Such a configuration may include a bi-metal switch formed in the stator windings of the motor. The bi-metal switch, having a temperature sensing capability, includes a closed position providing electrical continuity through the stator windings during normal operation of the motor, and an open position preventing electrical continuity through the stator windings when an overheat condition is sensed by the bi-metal switch.

Preferably, the overheat sensor is configured to detect the presence of an overheat condition when a threshold temperature of about 320 degrees F.

The present invention also provides an apparatus for inhibiting damage to a motor pump. The apparatus includes a pump head and motor as described above, and a sensor switch positioned in the motor adjacent the pump head for sensing the temperature of the pump head and the motor and preventing operation of the motor when a threshold temperature is sensed. The sensor switch preferably includes a bi-metal switch configured as described above.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
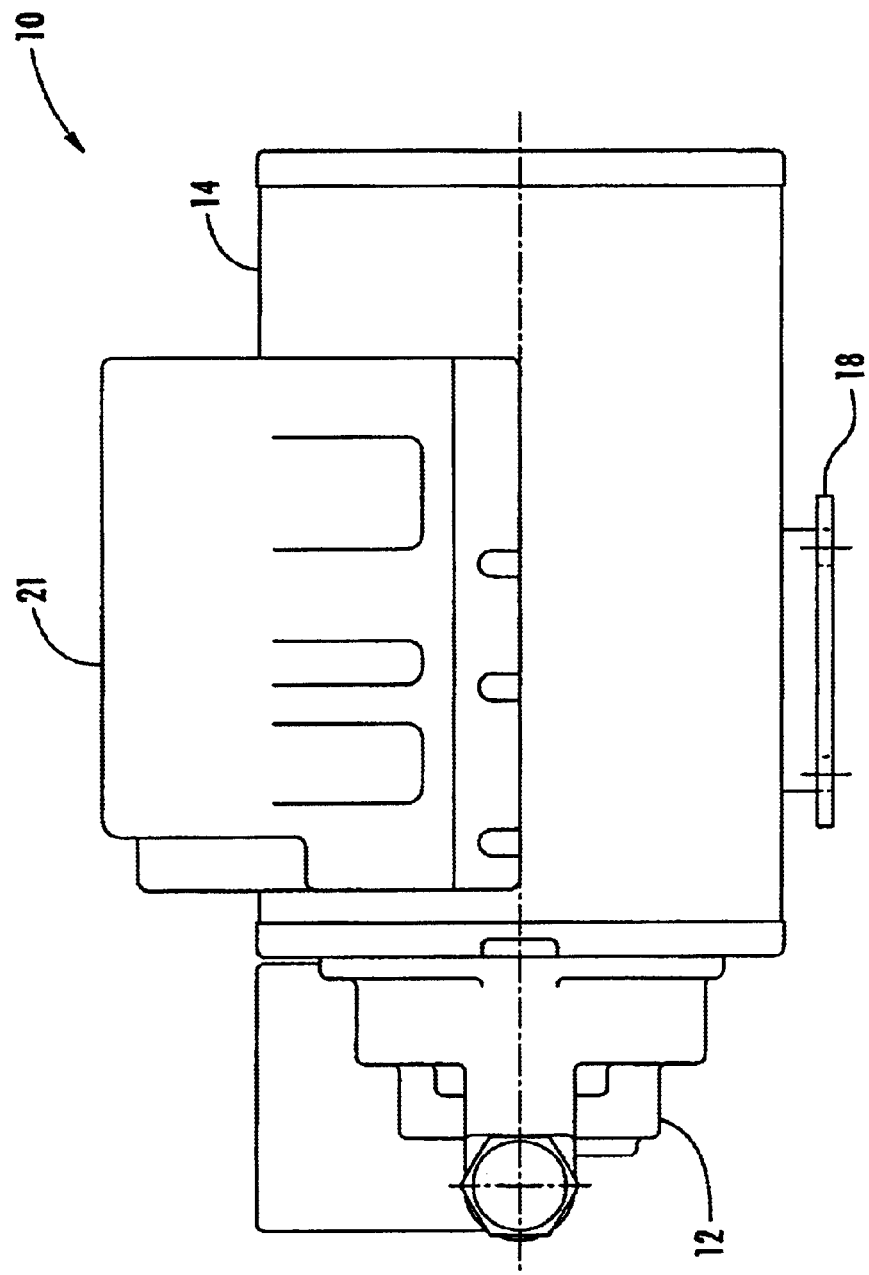
FIG. 1 is a side view of a canned motor pump according to the present invention.

Preferred embodiments of the present invention will now be described with reference to the accompanying drawings, wherein like reference characters designate like or similar parts throughout. The terminology used herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 2:
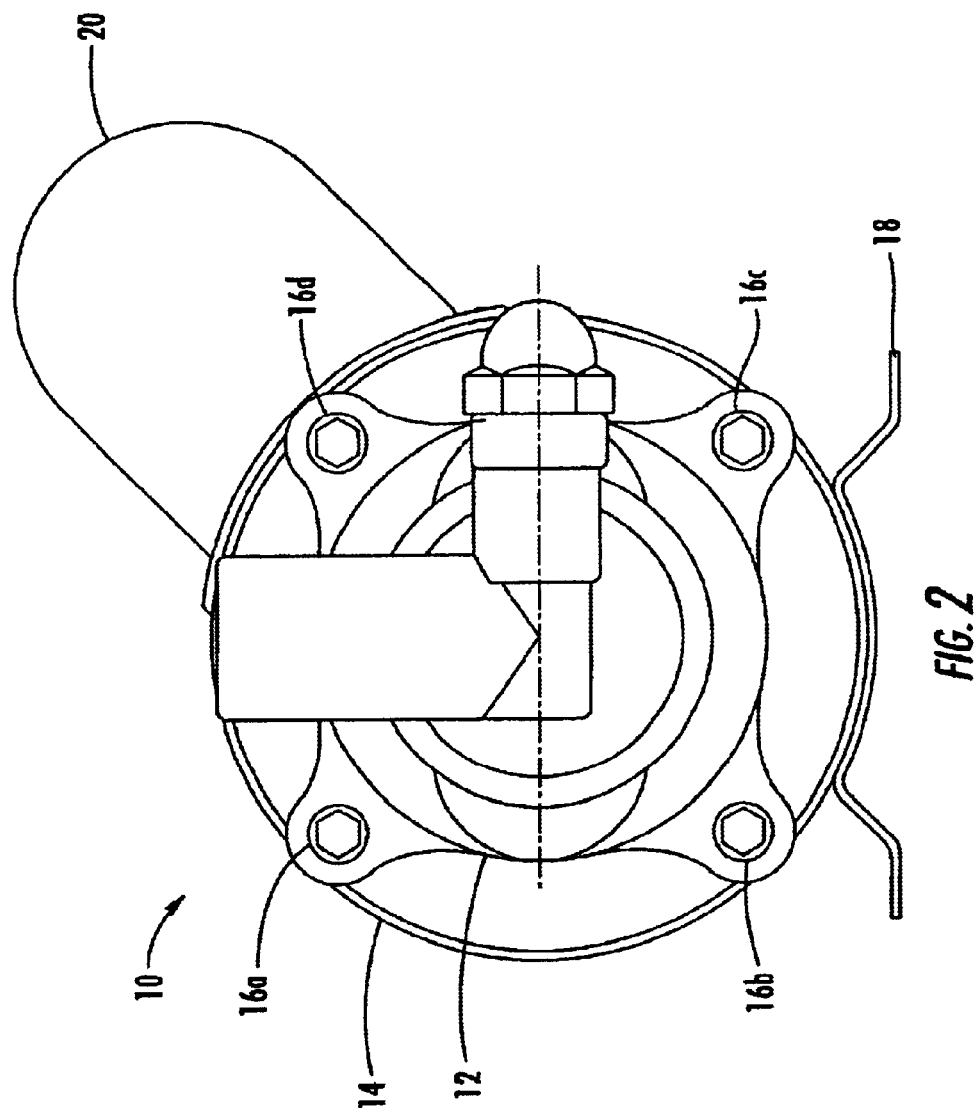
FIG. 2 is an end view of the pump head for the canned motor pump of FIG. 1.

FIGS. 1 and 2 illustrate, respectively, side and end views of a canned motor pump 10 according to a preferred embodiment of the invention. The pump 10 includes a pump head housing 12 which houses internal components of the pump attached to a motor housing 14 for housing electric motor components. The pump head housing 12, which functions to receive a fluid at a first pressure and output the fluid at a second pressure greater than the first pressure, is attached to the motor housing 14 as by bolts 16a–d or other suitable attachment or fastening devices. A mounting bracket 18 is attached to the motor housing 14 to facilitate installation of the motor pump 10. The electric motor contained in motor housing 14 operates to drive pump head components contained in the pump head housing 12 to produce flow and pressure of a pumped fluid, such as potable water for use in beverage machines. Although other types of motors may be used in the practice of the invention, the particular motor type illustrated in FIGS. 1 and 2 is a ½ horsepower, permanent split capacitor (PSC) motor with a capacitor housing 21.

Figure 3:
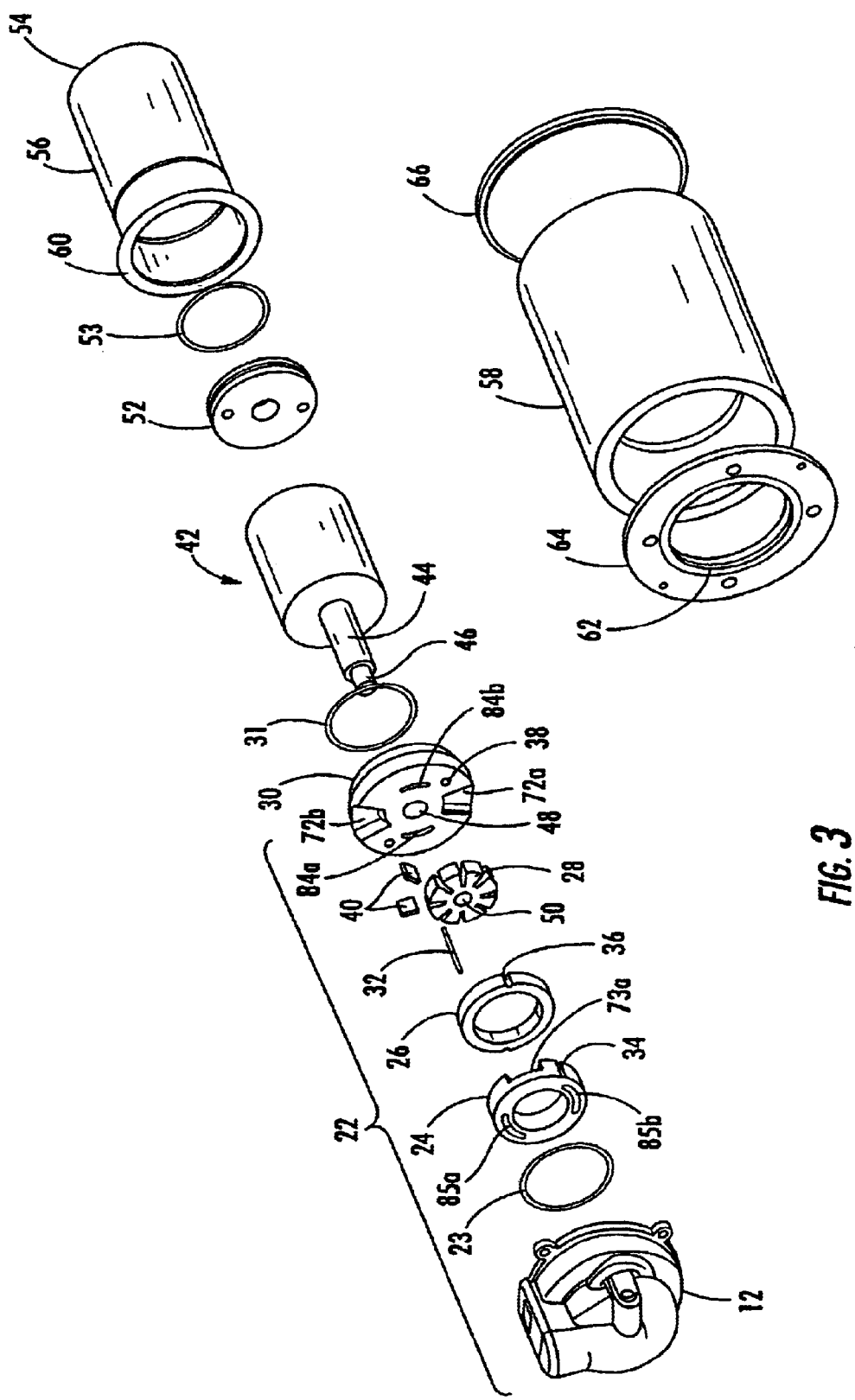
FIG. 3 is an exploded view of a canned motor pump with a rotary vane pump head according to the invention.

As shown in the exploded view of FIG. 3, the pump head 22 includes the pump head housing 12, front pump head O-ring 23, front bearing 24, cam ring 26, pump rotor 28 with sliding vanes 40, pin 32, and rear bearing 30. A total of eight (8) of the vanes 40 are preferably employed for the particular pump rotor 28 shown in FIG. 3. For purposes of clarity, only two (2) of the vanes 40 are depicted in FIG. 3. The front bearing 24, cam ring 26, and rear bearing 30 are fabricated from a suitable material (such as carbon, silicon, graphite, polymer, glass and steel), and these parts are preferably locked to one another by use of the pin 32 positioned in grooves 34, 36 provided in the outer surfaces of the front bearing 24 and the cam ring 26, respectively, and in a detent 38 formed in the rear bearing 30. The pump rotor 28 is preferably fabricated from stainless steel and includes a plurality of slots each of which contains a vane 40. A rear pump head O-ring 31 provides a seal between the pump head 22 and motor 14.

With continued reference to FIG. 3, a canned motor rotor 42 includes a shaft 44, preferably a hollow shaft, having a keyed end 46 which penetrates through openings 48, 50 formed in the rear bearing 30 and pump rotor 28, respectively. The pump rotor opening 50 is keyed to the rotor shaft 44 so that rotation of the rotor shaft 44 produces rotation of the pump rotor 28 and its vanes 40. The distal end of the rotor shaft 44 is supported by motor bearing 52 which is attached to the closed end 54 of a stator barrier can 56. A motor bearing O-ring 53 is positioned between the motor bearing 52 and the inner surface of the stator barrier can 56. The stator barrier can 56 is positioned in the air gap of the motor 58 and functions to protect the stator laminations/windings from contact with the pumped fluid. The stator barrier can 56 includes a flange 60 adjacent to the open end of the can 56 which is received by an annular seat 62 formed on one side of the front motor endshield 64. A rear motor endshield 66 provides closure for the rear portion of the motor 58.

Figure 6:
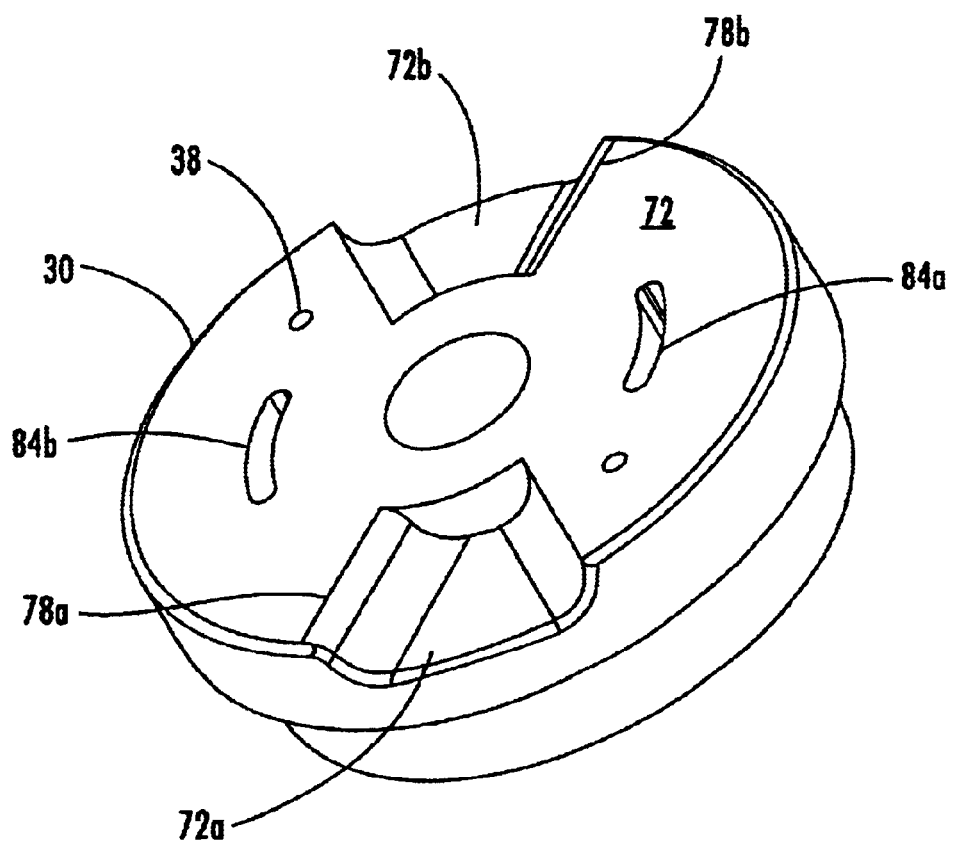
FIG. 6 is an isometric view of an end bearing according to the invention showing contoured inlet passages.
Figure 7:
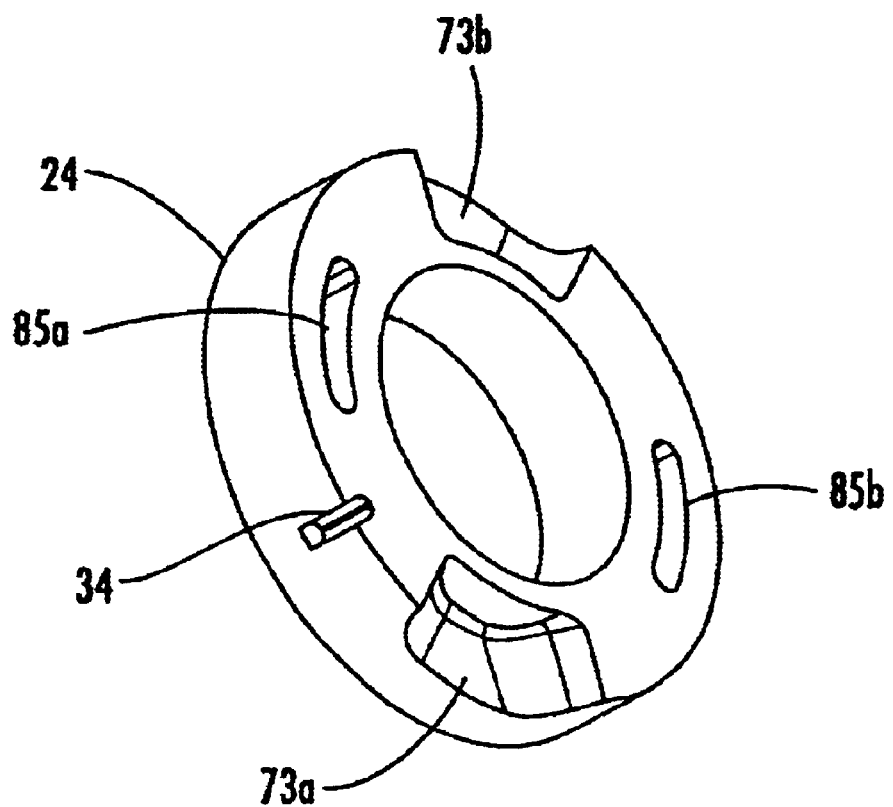
FIG. 7 is an isometric view of a front bearing according to the invention showing contoured fluid pockets.

With reference now to FIGS. 4–8, inlet fluid enters the pump head housing 12 at low pressure inlet 20. The fluid moves from low pressure inlet 20 into an intake plenum chamber 70 defined by an annular space surrounding the cam ring 26 and bounded on one side by the pump head housing 12 with the other side bounded by the front surface 72 of the rear bearing 30. Opposed fluid intake channels 72a, 72b formed on the rear bearing front surface 72 provide flow channels for fluid to flow from the intake plenum chamber 70 to suction zones 74a, 74b of opposed fluid pumping chambers 76a, 76b formed between the pump rotor 28 the cam ring 26. Fluid flowing from pockets 73a, 73b (FIG. 7) formed in the front bearing 24 flows into the suction zones 74a, 74b. The fluid intake channels 72a, 72b of the rear bearing 30 are illustrated in FIG. 6, and the fluid pockets 73a, 73b of the front bearing 24 are illustrated in FIG. 7. As can be seen in FIG. 6, upstream edges 78a, 78b of the fluid intake channels 72a, 72b are each preferably contoured to enhance flow characteristics, reduce noise, and reduce cavitation. As similarly shown in FIG. 7, upstream edges 79a, 79b of the pockets 73a, 73b formed in the front bearing 24 are also preferably contoured to enhance flow characteristics and to reduce noise and cavitation.

Referring again to FIG. 5, the pumping chambers 76a, 76b may be formed by making the pump rotor 28 substantially round and making the inner surface of the cam ring 26 substantially oval or oblong. Within the pumping chambers 76a, 76b, fluid is moved by the sweeping action of the vanes 40 through pumping zones 80a, 80b and then into pumping zones 82a, 82b. The increasing volume within the suction zones 74a, 74b functions to draw fluid by suction force from the intake plenum chamber 70 into the pumping chambers 76a, 76b. Likewise, the decreasing volume within the pumping zones 82a, 82b functions to force the flow out of the pumping zones 82a, 82b through opposed rear bearing discharge passages 84a, 84b and through front bearing discharge passages 85a, 85b.

Pressure loads generated in the pumping zones 82a, 82b exert forces generally in a radial direction on the pump rotor 28 and cam ring 26. Since the pumping zones 82a, 82b are in opposition to one another, the pressure loads are transmitted substantially symmetrically to the pump rotor 28 and cam ring 26. This substantially even distribution of loads tends to balance the loads transmitted to the motor shaft 44, thereby minimizing the bearing loads acting upon rear bearing 30. The load balancing also tends to inhibit separation of pump head parts. It has been observed that unbalanced loads transmitted to the rear bearing can require power levels 20–30% greater to deliver the same amount of pump output. Evenly distributing the loads generated in the pumping zones 82a, 82b also has the advantageous effect of centering the cam ring 26 within the pump head housing 12.

Figure 9:
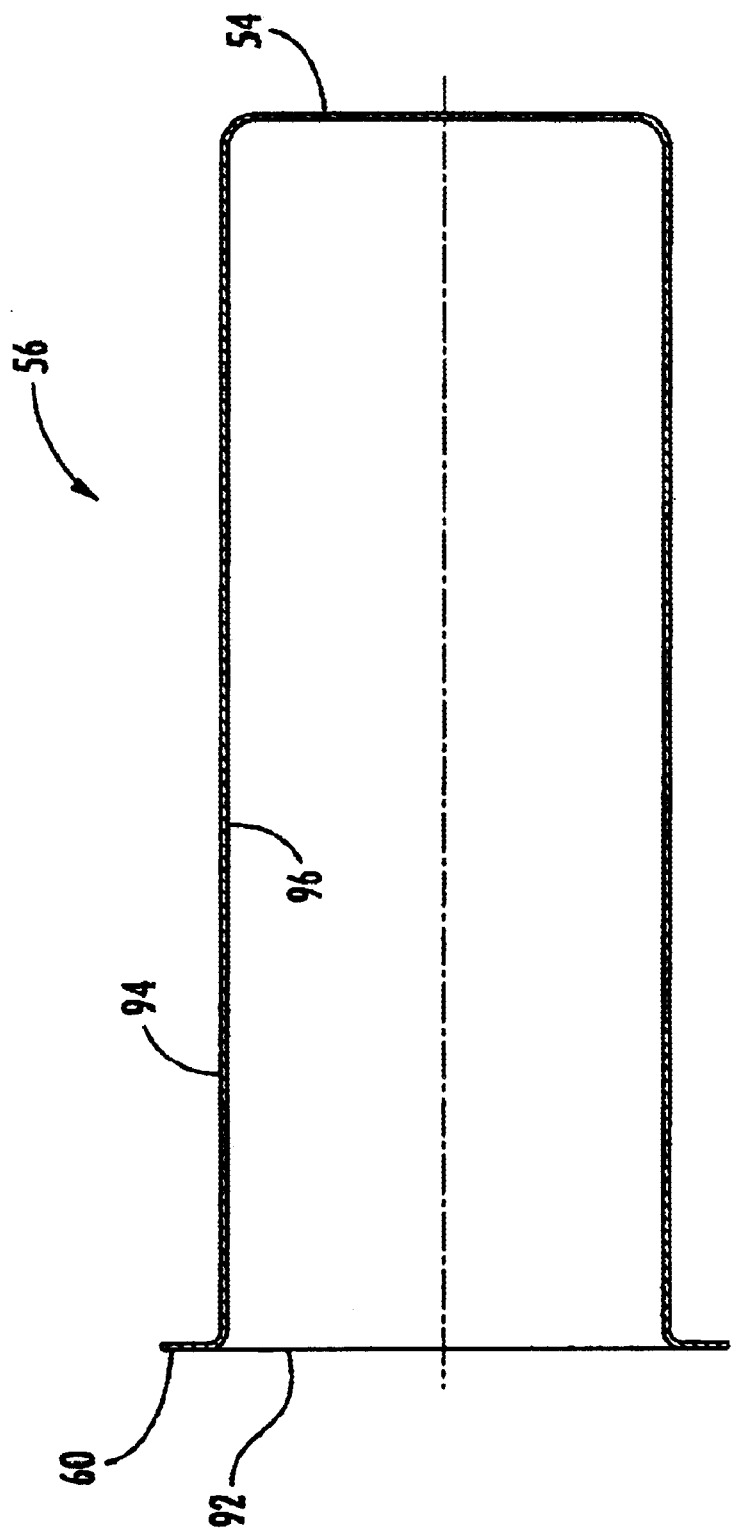
FIG. 9 is a cross-section view of a stator barrier can according to the invention.

Referring again to FIG. 4, pressurized fluid exits the pump head 22 through the rear bearing discharge passages 84a, 84b and enters that portion of the motor 14 commonly referred to as the air gap 88. The stator barrier can 56 provides a seal to prevent pressurized fluid from contacting the stator laminations 90. The stator barrier can 56, shown also in FIG. 9, is preferably fabricated as a single metal part using a deep drawing process. So, the can 56 requires no welding. The can 56 is further defined by an open end 92 in opposed relation to a closed end 54. The open end 92 includes an annular flange 60.

Figure 4:
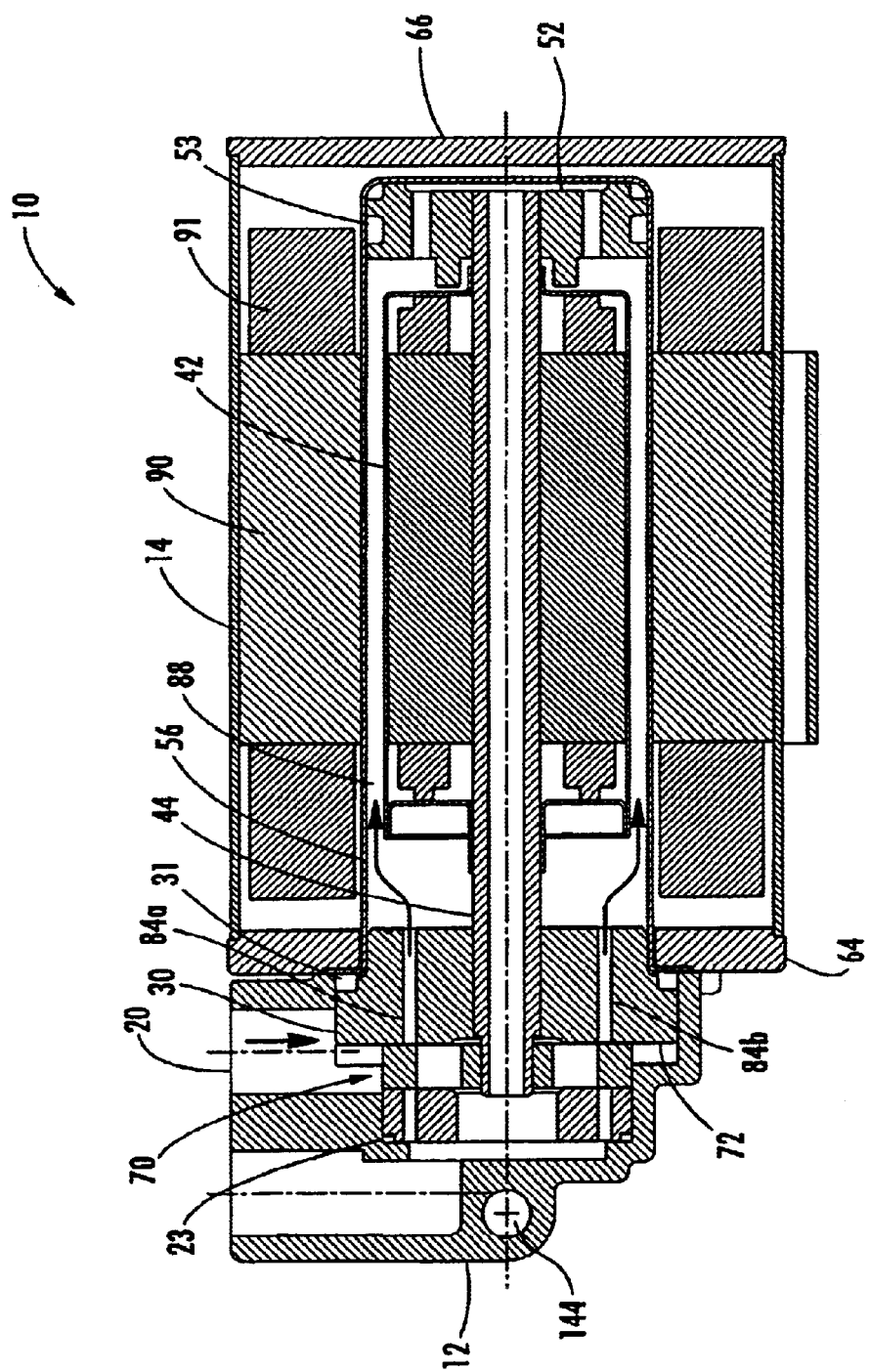
FIG. 4 is a cross-section view of a canned motor pump with a rotary vane pump head according to the invention with the pump in a low-pressure state.
Figure 5:
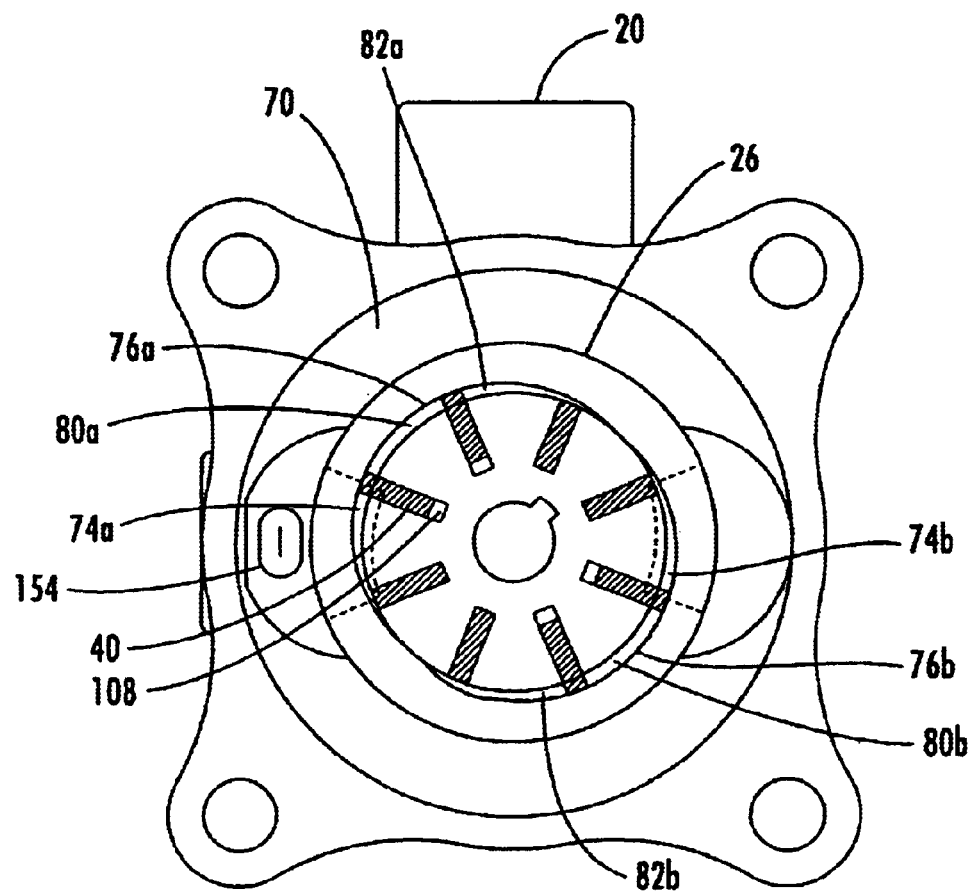
FIG. 5 is an open view of the rotary vane pump head of FIG. 4.
Figure 8:
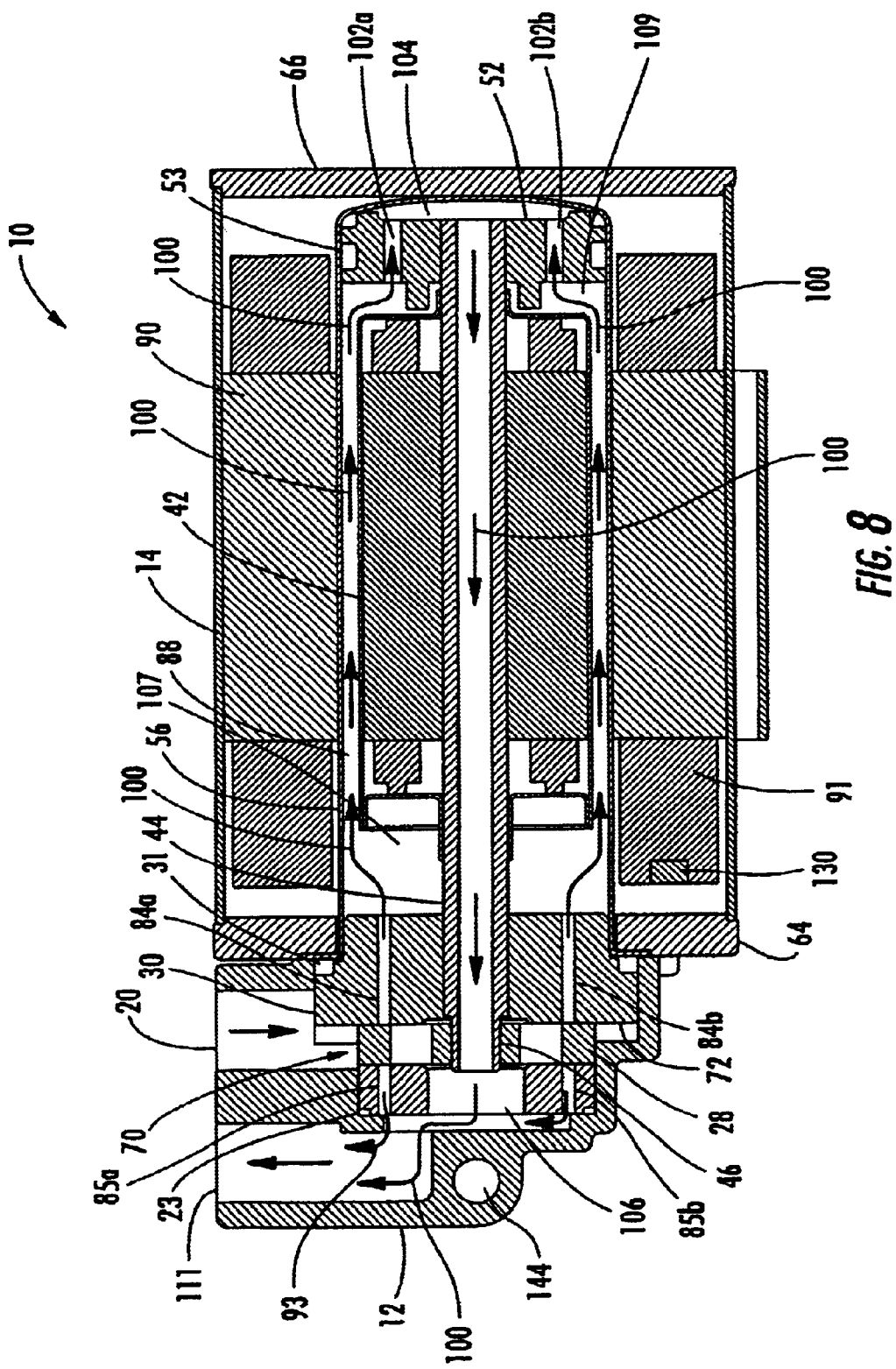
FIG. 8 is a cross-section view of a canned motor pump according to the invention with the pump in a high-pressure state.

In the interest of minimizing the air gap to enhance motor performance, can walls 94 are preferably relatively thin. In a preferred embodiment, the can walls 94 are made so thin that they require additional structural support when loaded by pressurized fluid. In operation, additional structural support is largely provided by the motor laminations 90 and the rear motor endshield 66. In FIG. 4, the can 56 is shown in relaxed state with no internal fluid pressures acting upon the can 56. When loaded by sufficiently pressurized fluid acting upon inner surface 96 of the can 56, the can 56 will tend to deform and contact the rear motor endshield 66, as shown in FIG. 8. However, the endshield 66 does not have to carry the full load. Loads may also be carried by the flange 60 and its supporting front motor endshield 64 as well as the stator laminations 90.

The can 56 is designed to have a small clearance fit between the can 56 and the stator laminations 90 for ease of assembly. The particular application of the pump 10 can be used to determine how much clearance should be provided. For example, in applications where the pumped fluid is to be used to remove heat from the motor 14, the clearance between the can 56 and stator laminations 90 should be small so as to increase the amount of contact and thermal conductivity between the can 56 and the laminations 90. Conversely, for applications where it is desirable to thermally isolate the pumped fluid from the motor 14, the clearance between the can 56 and laminations 90 should be greater.

During fabrication of the can 56, the can's roundness is somewhat difficult to control due to the stresses experienced in the material as the can 56 is formed. The middle portion of the can 56 is typically out-of-round. Typically, the can 56 has well controlled diameters at both ends. For applications where it is desirable to use the pumped fluid to remove heat from the motor 14, the resultant tight tolerances necessitate application of a moderate amount of force during insertion of the can 56 into the stator bore. As the can 56 is inserted into the stator bore, it will typically come to rest with one or more portions of the outer surface of the can 56 in contact with the stator laminations 90. As the pump 10 generates pressure, the can 56 expands and more fully contacts the motor laminations and more fully conforms to the shape of the stator bore. Making the can 56 thin and expandable in this manner provides numerous advantages. First, since the can 56 is conformable, manufacturing imperfections in the can 56 are easily compensated. Second, the thinness of the can 56 minimizes the overall size of the motor air gap, which improves motor performance. Third, the can 56 is able to take advantage of existing motor structure to improve pump performance. Fourth, allowing the can 56 to expand against and conform to the motor laminations 90 provides for a more efficient transfer of heat from the motor stator to the fluid for purposes of motor cooling.

As shown in FIG. 8, during pump operation pressurized fluid supplied by the pump head 22 passes along that portion of the motor air gap 88 separating the motor rotor 42 and the stator barrier can 56. Pressurized fluid flow continues, as indicated by flow arrows 100, through motor bearing passages 102a, 102b into aft fluid chamber 104 and returning to a discharge plenum chamber 106 in the pump head 22 by way of the hollow rotor shaft 44. The discharge plenum chamber 106 communicates directly with a high pressure outlet 111. Circulation of fluid through the pump 10 in this manner functions to remove heat from the motor 14 during operation. It also circulates fluid to the motor bearing 52 to keep it cool and clean.

Figure 11:
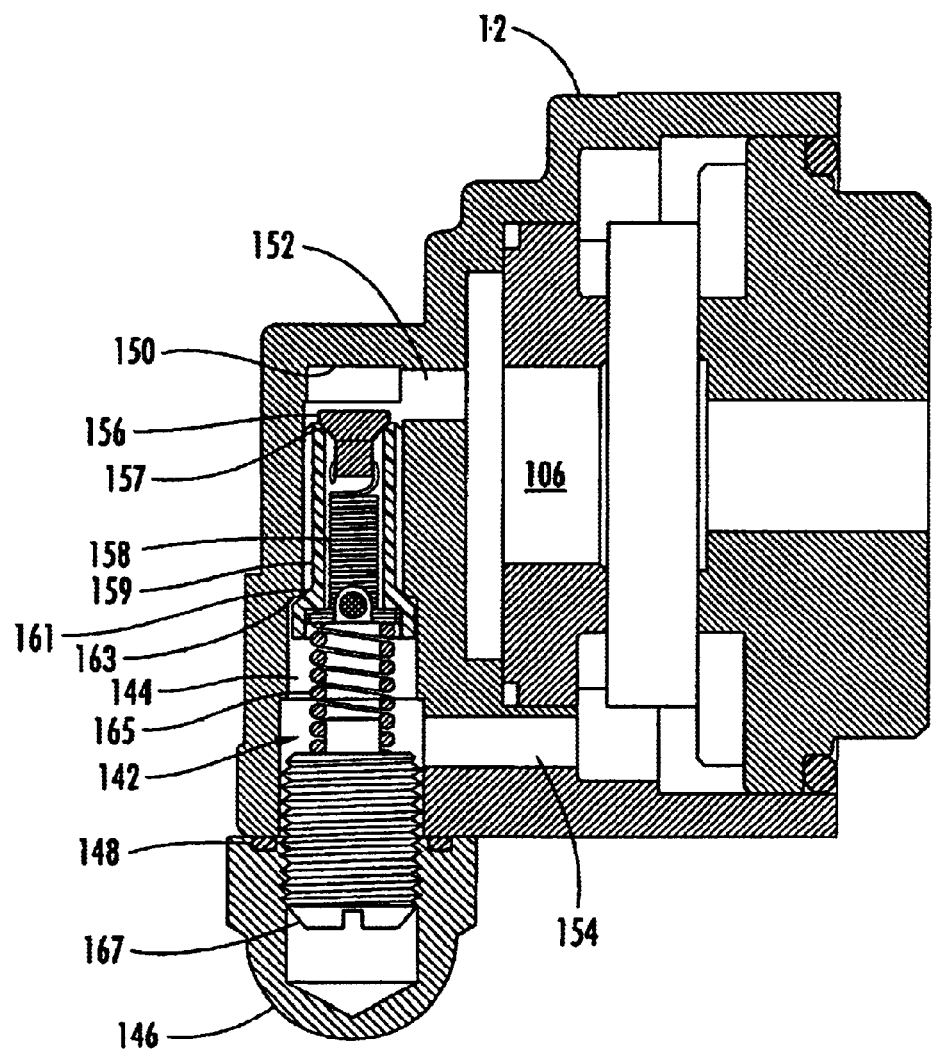
FIG. 11 is a cross-section view of a pump head according to the invention showing the pressure relief valve.

Typical vane pumps employ a pressure relief valve positioned in or near the low pressure inlet to prevent overpressure conditions from damaging the pump. Such a relief valve configuration tends to undesirably impede the flow of fluid into the pump. As shown in FIG. 11, the present invention eliminates the difficulties associated with known relief valve configurations by moving the pressure relief valve 142 away from the low pressure inlet 20 and high pressure outlet 111 and allowing the high and low pressure regions of the pump 10 to communicate with each other through the relief valve 142. This is accomplished by providing a relief valve cavity 144 in the pump head housing 12. Adjacent upper end 150 of the relief valve cavity 144 is an upper relief valve cavity passage 152 in fluid communication with the high pressure discharge plenum chamber 106. A lower relief valve cavity passage 154 is in fluid communication with the low pressure intake plenum chamber 70. A removable cap 146 provides external access to the relief valve cavity 144, and a cap O-ring 148 provides a fluid seal between the cap 146 and pump head housing 12.

The relief valve 142 includes a poppet 156 held against a seat 157 by poppet spring 158 within an upper flow tube 159. The flow tube 159 includes an annular seat 161 which is positioned against shoulder 163 to form a seal. Flow tube spring 165 acts to force the seat 161 against the shoulder 163 as shown. The force applied by spring 165 is adjustable by a threaded connector 167 which also functions to secure the relief valve 142 within its cavity 144. Travel of the poppet 156 is limited by the upper end 150 in such a way as to prevent the poppet 156 from being pulled into the discharge passage 152 in the event the poppet 156 moves toward chamber 106.

The relief valve 142 is configured to allow flow through the relief valve cavity 144 in either direction. In high pressure bypass mode when fluid pressures exerted on the valve poppet 156 and flow tube 159 are sufficient to overcome the force of spring 165, the upper flow tube 159 moves downwardly from its seated/closed position with high pressure fluid entering the cavity 144 through passage 152 and exiting through passage 154. In low pressure bypass mode when fluid pressures exerted on the valve poppet 156 are sufficient to overcome the force of spring 158, low pressure fluid in the low pressure intake plenum chamber 70 enters the relief valve cavity 144 through passage 154, moves the poppet 156 upwardly away from its seat 157, and exits the cavity 144 through passage 152.

Typical pump motor combinations use a pump head and a separate motor. In extreme thermal loading conditions within the pump head, the pump head will overheat. While most motors include a thermal sensor/switch to shut down the motor when the motor overheats, overheat conditions within the pump head are not detected by the motor sensor. As a result, the motor will continue driving the overheated pump head until catastrophic failure occurs.

In accordance with one aspect of the present invention, the motor overheat sensor/switch is reconfigured in such a way as to sense overheat conditions within the pump head 22 as well as the motor 14. In a preferred embodiment, this is accomplished by positioning an overheat sensor switch 130 within the motor stator windings 91 in an area adjacent the pump head 22. Preferably, the overheat sensor/switch 130 is of a bi-metal type and integral with the stator windings 91 so as to open the circuit of the stator windings 91 and prevent motor operation when a threshold overheat temperature, preferably about 320 degrees F., is sensed. When the overheat condition is no longer present, the bi-metal switch closes and pump operation may resume. (In an alternate switch embodiment, the switch must be manually reset before the pump resumes operation.) The bi-metal switch 130 includes a closed position providing electrical continuity through the stator windings 91 during normal operation of the motor 14, and an open position preventing electrical continuity through the stator windings 91 when an overheat condition is sensed by the bi-metal switch 130.

It will be understood that other configurations of the sensor/switch 130 may be employed in the practice of the invention. For example, instead of an integral sensor/switch, a temperature sensor may be positioned adjacent the pump head 22 in the motor windings 91 or in some other location where the sensor can sense the temperature of the pump head 22 as well as the motor 14. The output of the temperature sensor is provided to a processor or relay which activates a switch to prevent motor operation when a threshold temperature is sensed. Thus, the present invention contemplates a single sensing device that can sense the presence of an overheat condition in either the pump head 22 or motor 14 so that action can be taken to shut down or otherwise prevent operation of the pump 10 when an overheat condition is present in the pump 10. This helps prevent damage to the pump 10 in dry running conditions as well as severe overload conditions.

It will be appreciated that while prior art pumps inefficiently feed high pressure fluid through the motor and then discharge the high pressure fluid to a low pressure region of the pump (typically the inlet), the pump 10 of FIG. 8 does not suffer such a disadvantage. Instead, the pump 10 of FIG. 8 connects the pumping zones 82*a*, 82*b* of both pumping chambers 76*a*, 76*b* by splitting the flow and providing what is essentially two discrete paths of flow within the pump 10 with both portions of the flow recombining in the same discharge plenum chamber 106. One discrete flow path is from the pumping zones 82*a*, 82*b*, through front bearing discharge passages 85*a*, 85*b*, and into the discharge plenum chamber 106. The other discrete flow path is from the pumping zones 82*a*, 82*b*, through rear bearing discharge passages 84*a*, 84*b*, into that portion of the motor air gap 88 separating the motor rotor 42 and the stator barrier can 56, through motor bearing passages 102*a*, 102*b* into aft fluid chamber 104, through the hollow rotor shaft 44, and into the discharge plenum chamber 106.

In operation, flow is discharged though the pump from both sides of the pump rotor 28 through discharge passages 84*a*, 84*b*, 85*a*, 85*b*. The initial pressures in discharge passages 84*a*, 84*b*, 85*a*, 85*b* are equal, which balances the thrust loading of the pump rotor 28. Also, the discharge plenum chamber 106 is able to communicate to both sides of the pump rotor 28 through vane slot passages 108 formed when vanes 40 slide outwardly into a pumping chamber 76*a* and 76*b*. This allows further thrust balancing by supplying both sides of the pump rotor 28 with fluid pressure equal to that found in chamber 106. The flow path from discharge passages 85*a*, 85*b* to chamber 106 is much shorter than from discharge passages 84*a*, 84*b* to chamber 104. As fluid passes from chamber 107 to chambers 109 and 104, there is a pressure differential created by the additional distance and restricted flow area formed by the motor rotor 42 and the barrier can 56 as illustrated by fluid flow arrows 100. This tends to create a slight thrust load on the pump head side of the motor rotor 42, which tends to move the motor rotor 42 away from the pump rotor 28. In addition, the motor stator laminations 90 and rotor laminations tend to align on the electrical center of the motor during operation causing further movement between the two rotors. Manufacturing tolerances and process variations create further movement of the relative position of both rotors. These relative movements between the two rotors require additional torque from the motor as the two rotors thrust against their respective thrusting surfaces. To reduce this tendency, the motor rotor 42 and pump rotor 28 are connected by a sliding keyed end joint 46 to allow free axial movement of the two parts which minimizes parasitic loads in the system.

Figure 10:
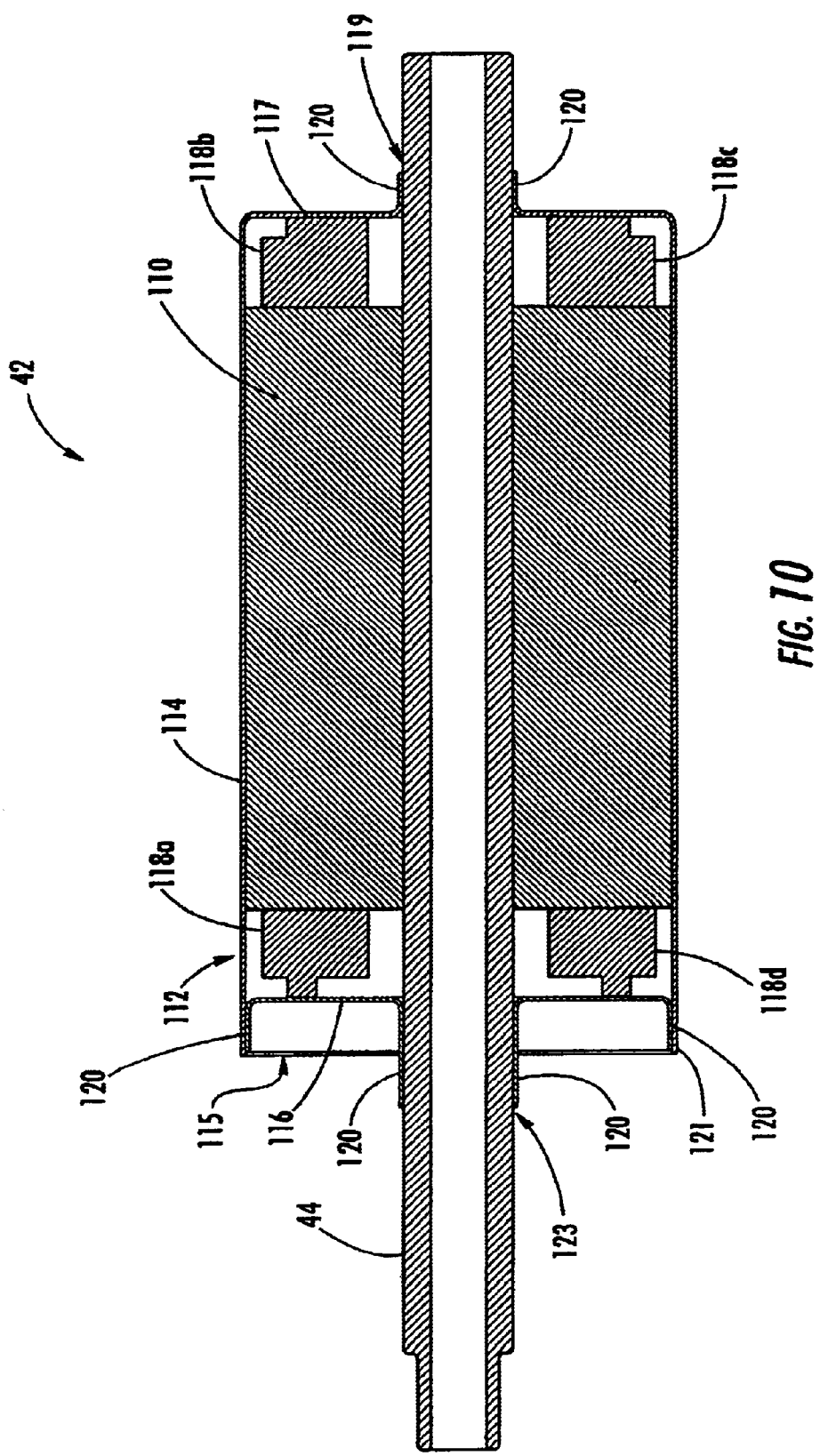
FIG. 10 is a cross-section view of a canned rotor with hollow shaft according to the invention.

The motor rotor 42, as shown in greater detail in FIG. 10, includes the hollow shaft 44 onto which the rotor laminations 110 are attached. The rotor lamination 110 are sealed from and protected against the pumped fluid by a thin rotor barrier can 112. The can 112 includes a cover portion 114 and a cap 116. Spacers 118*a*–*d* interconnect the laminations 110 and can 112 to provide added structural support. The can 112 may be assembled to the shaft 44 as by applying a positive mechanical attachment method (such as a weld, pressure fit, or adhesive) at points 120.

Since the shaft 44 is hollow, it has the potential for greater deflection during operation. Electric motors exhibit a characteristic commonly referred to as "side pull" which results in the bending or movement of the rotor 42 during startup. Bending of the rotor 42 as a result of side pull is particularly noticeable when the running center of the rotor 42 is not coincident with the stator centerline as a result of manufacturing imperfections. Application of the rotor barrier can 112 to the rotor 42, in combination with positive mechanical attachments 120, provides additional stiffness which significantly improves the overall bending resistance of the rotor 42. For example, a 0.5 inch diameter shaft has a polar moment of inertia of about 0.00306 (in$^4$). The addition of a 0.25 inch diameter hole through the shaft 44 reduces the polar moment of inertia by about 6% to 0.00287 (in$^4$). The addition of a rotor barrier can 112 with a 0.014 inch wall thickness increases the moment of inertia to a value of 0.597 (in$^4$) even with the hollow shaft 44. This is an increase of nearly 15 times the original shaft stiffness. This will effectively reduce rotor deflection, during startup, by about the same ratio.

As discussed above, fluid flow through the pump 10 can cause slight pressure differentials within the pump 10. Such pressure differentials will be experienced in the forward and rearward motor chambers 107, 109. Both ends of the motor rotor 42 are subjected to pressures within the respective chambers 107, 109. This causes a thrust load that reduces the load applied to the pump rotor 28 and the motor bearing 52 when the pump 10 is mounted in a vertical position with the pump head below the motor.

Figure 12:
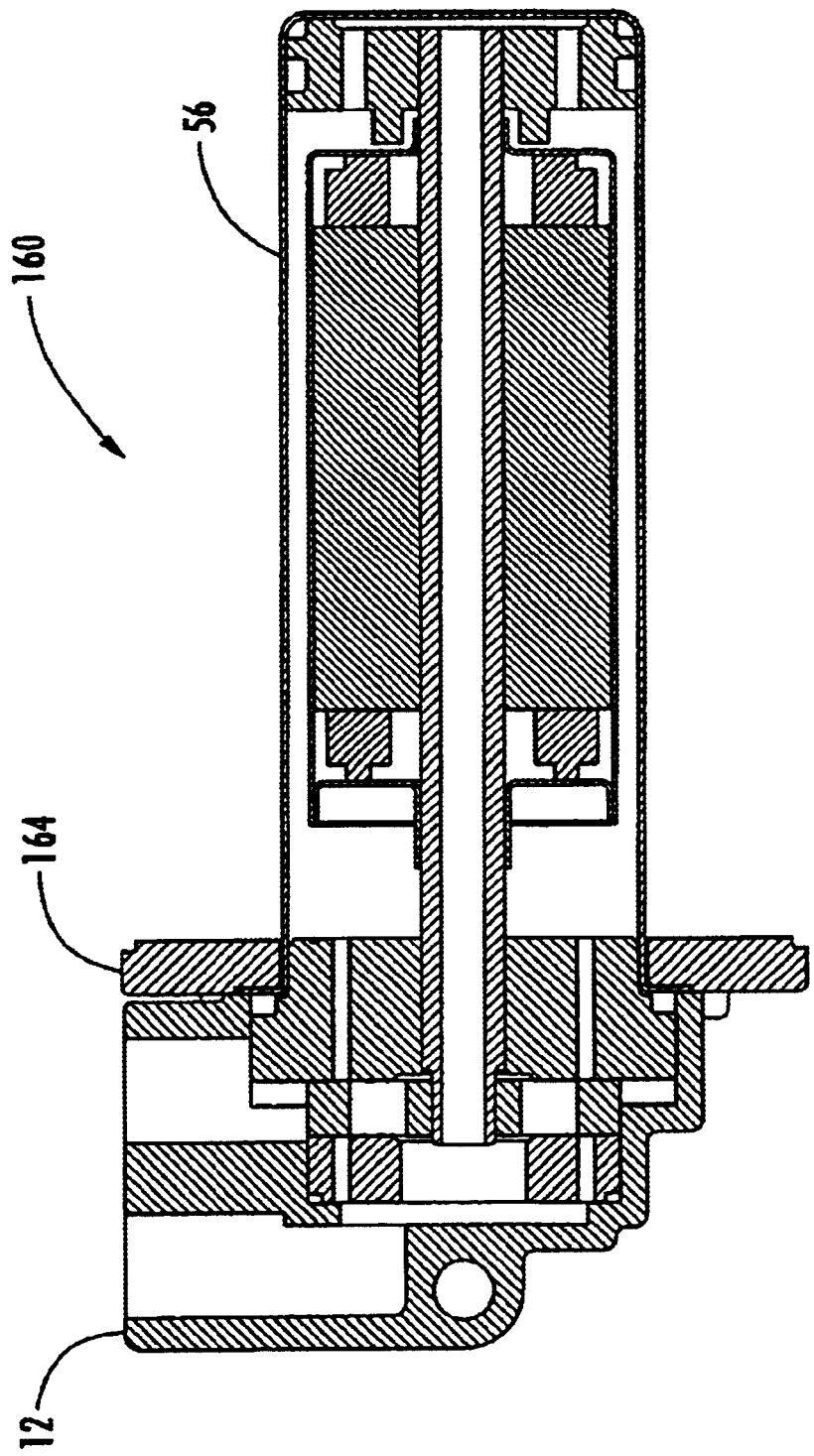
FIG. 12 is a cross-section view of a pump head subassembly according to the invention with the air gap clearance between the stator and rotor barrier cans slightly exaggerated for purposes of clarity.

The pump 10 enables the stator barrier can 56 to be assembled to the entire pump head 22 and motor rotor 42 by clamping the assembly 160 together with the front motor end shield 64 as shown in FIG. 12. The assembly 160 can be tested individually and treated for use in food applications without having to be fully assembled to the motor 14. This is also beneficial from a logistics standpoint because it allows for the production of pump head assemblies 160 ahead of schedule and the assemblies 160 can be stocked without committing to a particular motor type. It also allows for greater flexibility in the assembly methods employed, and it helps to reduce inventory and more easily meet customer demands.

Figure 13:
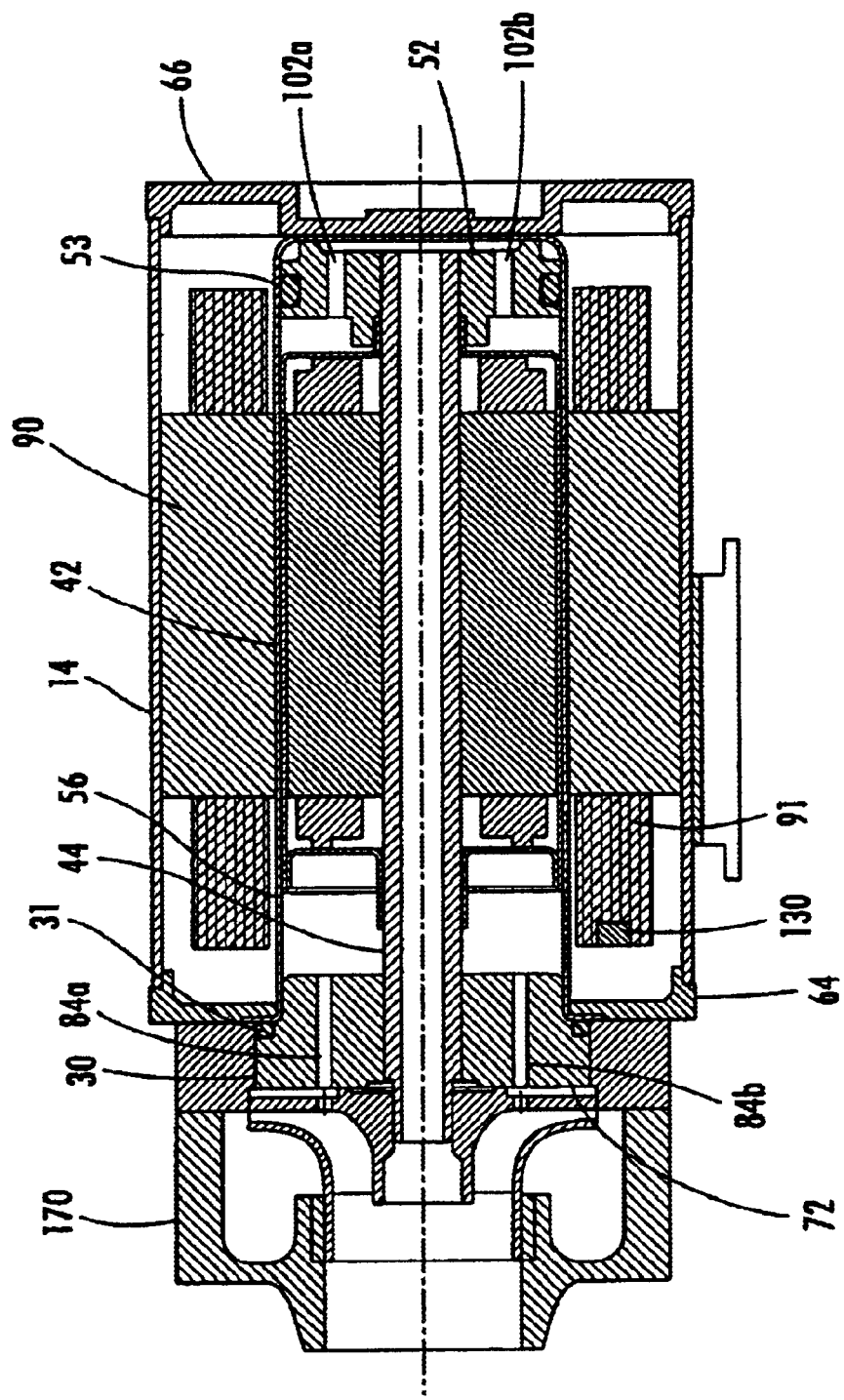
FIG. 13 is a cross-section view of a canned motor pump with a closed shroud centrifical pump head according to the invention.
Figure 14:
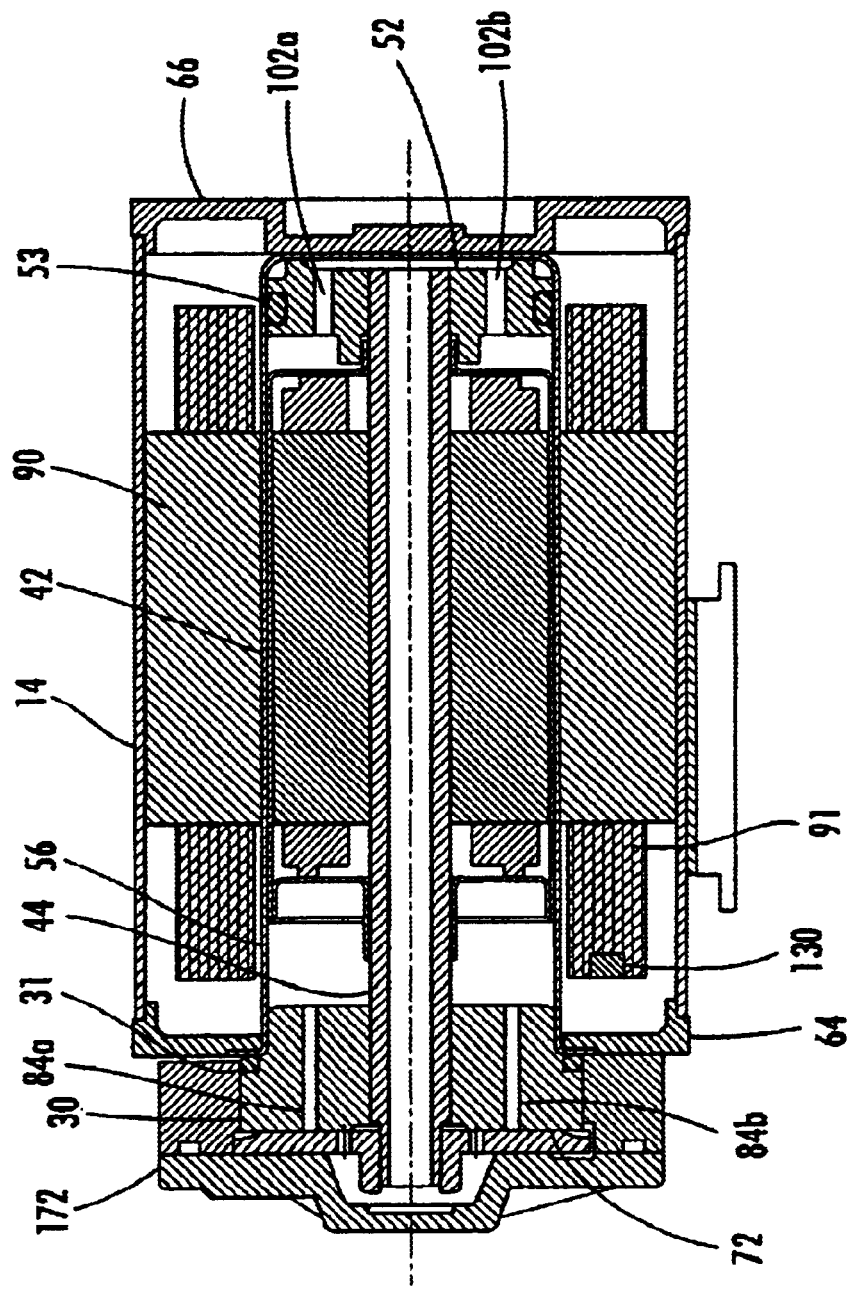
FIG. 14 is a cross-section view of a canned motor pump with a turbine pump head according to the invention.

It will be appreciated that a canned motor pump of the above described configuration is not limited to a rotary vane pump head. FIGS. 13 and 14 illustrate two alternate types of pump heads that may be employed in place of a rotary vane pump head. FIG. 13 shows a closed shroud centrifical pump head 170 driven by the motor 14, and FIG. 14 shows a turbine pump head 172 driven by the motor 14. Flow of fluid out of the pump heads 170, 172 through bearing discharge passages 84*a*, 84*b*, between the stator barrier can 56 and canned rotor 42, through motor bearing passages 102*a*, 102*b*, and returning to the pump heads 170, 172 by way of a hollow motor shaft 44 is the same as that described above with reference to a rotary vane pump head.

The foregoing description details one or more preferred embodiments of the present invention and describes the best mode contemplated. It will be appreciated, however, that no matter how detailed the foregoing description appears, the invention can be practiced in many ways without departing from the spirit of the invention. Therefore, the above mentioned description is to be considered exemplary rather than limiting.

What is claimed is:

1. An apparatus for detecting the presence of an overheat condition in a fluid pump, the apparatus comprising:

a pump head for receiving a fluid at a first pressure and outputting the fluid at a second pressure that is greater than said first pressure;

a motor positioned adjacent said pump head for driving the pump head to pressurize the fluid; and an overheat sensor in direct thermal association with both the pump head and the motor temperatures for sensing overheat conditions of the pump head and for sensing overheat conditions of the motor.

2. The apparatus of claim 1 wherein the overheat sensor is located within the motor.

3. The apparatus of claim 1 further comprising an electric circuit for providing power to the motor, and wherein said overheat sensor modifies the electrical circuit to prevent operation of the motor when an overheat condition is sensed.

4. The apparatus of claim 1 wherein said overheat sensor includes a bi-metal switch formed in stator windings of the motor, said bi-metal switch including:

a closed position providing electrical continuity through the stator windings during normal operation of the motor; and an open position preventing electrical continuity through the stator windings when an overheat condition is sensed by the bi-metal switch.

5. The apparatus of claim 1, further comprising a switch for preventing operation of the motor when an overheat condition is sensed.

6. The apparatus of claim 1 wherein said overheat sensor is configured to detect the presence of an overheat condition when a threshold temperature of about 320 degrees F. is sensed by the overheat sensor.

7. The apparatus of claim 1 wherein said pump head is a rotary vane pump head.

8. The apparatus of claim 1 wherein said pump head is a turbine pump head.

9. The apparatus of claim 1 wherein said pump head is a centrifugal pump head.

10. An apparatus for inhibiting damage to a fluid pump, the apparatus comprising:

a pump head for receiving a fluid at a first pressure and outputting the fluid at a second pressure that is greater than said first pressure;

a motor positioned adjacent said pump head for driving the pump head to pressurize the fluid; and a sensor switch positioned in said motor adjacent the pump head for directly sensing the temperature of the pump head and the motor and preventing operation of the motor when a threshold temperature is sensed.

11. The apparatus of claim 10 wherein said threshold temperature is about 320 degrees F.

12. The apparatus of claim 10 wherein said sensor switch comprises a bi-metal switch formed in the stator windings of the motor, said bi-metal switch including:

a closed position providing electrical continuity through the stator windings during normal operation of the motor; and an open position preventing electrical continuity through the stator windings when an overheat condition is sensed by the bi-metal switch.

13. The apparatus of claim 10 wherein said pump head is a rotary vane pump head.

14. The apparatus of claim 10 wherein said pump head is a turbine pump head.

15. The apparatus of claim 10 wherein said pump head is a centrifugal pump.

16. An apparatus for inhibiting damage to a motor pump, the apparatus comprising:

a pump head for receiving a fluid at a first pressure and outputting the fluid at a second pressure that is greater than said first pressure;

a motor positioned adjacent said pump head for driving the pump head to pressurize the fluid; and a bi-metal switch formed in stator windings of the motor adjacent the pump head for sensing the temperature of the pump head and the motor and preventing operation of the motor when a threshold temperature is sensed, said bi-metal switch including:

a closed position providing electrical continuity through the stator windings during normal operation of the motor; and an open position preventing electrical continuity through the stator windings when an overheat condition is sensed by the bi-metal switch.

17. The apparatus of claim 16 wherein said threshold temperature is about 320 degrees F.

18. The apparatus of claim 16 wherein said pump head is a rotary vane pump head.

19. The apparatus of claim 16 wherein said pump head is a turbine pump head.

20. The apparatus of claim 16 wherein said pump head is a centrifugal pump.

* * * * *

UNITED STATES PATENT AND TRADEMARK OFFICE
CERTIFICATE OF CORRECTION

PATENT NO. : 6,837,688 B2  Page 1 of 1
DATED : January 4, 2005
INVENTOR(S) : Kimberlin et al.

It is certified that error appears in the above-identified patent and that said Letters Patent is hereby corrected as shown below:

Column 2,
Line 46, "centrifical" should be changed to -- centrifugal --.

Column 3,
Line 66, after "rotor 28", insert -- and --.

Column 8,
Line 48, "centrifical" should be changed to -- centrifugal --.

Signed and Sealed this

Seventh Day of June, 2005

JON W. DUDAS
*Director of the United States Patent and Trademark Office*